US011961678B2

(12) United States Patent
Imagawa

(10) Patent No.: US 11,961,678 B2
(45) Date of Patent: Apr. 16, 2024

(54) FILM CAPACITOR DEVICE

(71) Applicant: KYOCERA Corporation, Kyoto (JP)

(72) Inventor: Kazuki Imagawa, Kirishima (JP)

(73) Assignee: Kyocera Corporation, Kyoto (JP)

( * ) Notice: Subject to any disclaimer, the term of this patent is extended or adjusted under 35 U.S.C. 154(b) by 178 days.

(21) Appl. No.: 17/763,338

(22) PCT Filed: Sep. 15, 2020

(86) PCT No.: PCT/JP2020/034945
§ 371 (c)(1),
(2) Date: Mar. 24, 2022

(87) PCT Pub. No.: WO2021/065487
PCT Pub. Date: Apr. 8, 2021

(65) Prior Publication Data
US 2022/0367116 A1    Nov. 17, 2022

(30) Foreign Application Priority Data

Sep. 30, 2019   (JP) ................. 2019-180400

(51) Int. Cl.
*H01G 4/232*   (2006.01)
*H01G 4/30*    (2006.01)

(52) U.S. Cl.
CPC ............. *H01G 4/232* (2013.01); *H01G 4/30* (2013.01)

(58) Field of Classification Search
CPC .......... H01G 4/30; H01G 4/012; H01G 4/015; H01G 4/005; H01G 4/06; H01G 4/224
See application file for complete search history.

(56) References Cited

U.S. PATENT DOCUMENTS

| 2011/0181998 A1* | 7/2011 | Yang ..................... H01G 4/30 361/275.4 |
| 2015/0235766 A1* | 8/2015 | Nishiyama ............. H01G 4/30 361/301.4 |
| 2016/0086727 A1* | 3/2016 | Choi ................... H01F 17/0013 336/200 |
| 2019/0287724 A1  | 9/2019 | Nogi |

FOREIGN PATENT DOCUMENTS

| CN | 109155196 A      | 1/2019  |            |
| DE | 2732748 A1       | 2/1979  |            |
| JP | 2003-257783 A    | 9/2003  |            |
| JP | 2003257783 A   * | 9/2003  |            |
| JP | 2005-217238 A    | 8/2005  |            |
| JP | 2016-009775 A    | 1/2016  |            |
| WO | WO-2018190437 A1 * | 10/2018 | ............... H01G 4/32 |

* cited by examiner

*Primary Examiner* — David M Sinclair
*Assistant Examiner* — Daniel M Dubuisson
(74) *Attorney, Agent, or Firm* — Volpe Koenig

(57) ABSTRACT

A film capacitor device includes a film stack with metal strips including adjacent metal strips in 180° opposite orientations in a direction in which the metal strips continuously extend, metal-sprayed electrodes on a pair of end faces of the film stack, and conductors extending continuously in a stacking direction on a pair of end faces (cut surfaces) different from the pair of end faces on which the metal-sprayed electrodes are located.

5 Claims, 4 Drawing Sheets

FILM CAPACITOR DEVICE

FIELD

The present disclosure relates to a film capacitor device.

BACKGROUND

A known technique is described in, for example, Patent Literature 1.

CITATION LIST

Patent Literature

Patent Literature 1: Japanese Unexamined Patent Application Publication No. 2016-9775

BRIEF SUMMARY

A film capacitor device according to an aspect of the present disclosure includes a film stack being rectangular, external electrodes, insulation areas, and a conductor. The film stack includes a plurality of dielectric films being stacked. Each of the plurality of dielectric films includes a plurality of metal strips extending in a first direction on a surface of the dielectric film. Each of the plurality of dielectric films includes an insulation margin extending in the first direction as a groove between adjacent metal strips of the plurality of metal strips. Each of the plurality of dielectric films includes, at an edge of the surface of the dielectric film in the first direction, an edge insulation area continuously extending in a second direction perpendicular to the first direction. The plurality of dielectric films include adjacent dielectric films in 180° opposite orientations in the first direction on the surface and alternate dielectric films having the edge insulation areas overlapping in a plan view. The external electrodes are on a pair of end faces of the film stack in the first direction. The insulation areas electrically insulate metal strips of the plurality of metal strips at two ends of the film stack in the second direction from the external electrodes. The conductor continuously extends in a stacking direction on at least one of a pair of end faces of the film stack in the second direction.

BRIEF DESCRIPTION OF DRAWINGS

The objects, features, and advantages of the present disclosure will become more apparent from the following detailed description and the drawings.

DETAILED DESCRIPTION

A film capacitor with the structure that forms the basis of a film capacitor device according to one or more embodiments of the present disclosure includes either a wound metalized film or metalized films stacked in one direction, which are metal layers to be an electrode, on the surface of a dielectric film of, for example, a polypropylene resin.

A stacked film capacitor device is a rectangular block with an appropriate size (capacity) cut from a stack of metalized films. The stacked film capacitor includes external electrodes on its pair of side surfaces.

The stacked film capacitor device with the structure that forms the basis of the film capacitor device according to one or more embodiments of the present disclosure includes the external electrodes (metal-sprayed electrodes) in areas not in contact with metal layers exposed at the ends, or specifically the cut surfaces of the stacked film capacitor device, instead of being arranged on the entire side surface. This structure reliably achieves insulation on the cut surfaces.

The dielectric films being stacked may have slight misalignment during stacking. The metal layers not in contact with the external electrodes are floating. However, such misalignment in stacking may cause the floating metal layers to overlap metal layers that are connected to the external electrodes in a plan view. This may cause a voltage to be applied to the floating metal layers through capacitive coupling. The floating metal layers are partially exposed at the cut surfaces. The application of voltage can thus cause electric discharge at the cut surfaces.

A film capacitor device according to one or more embodiments will now be described with reference to the drawings.

Figure 1A:
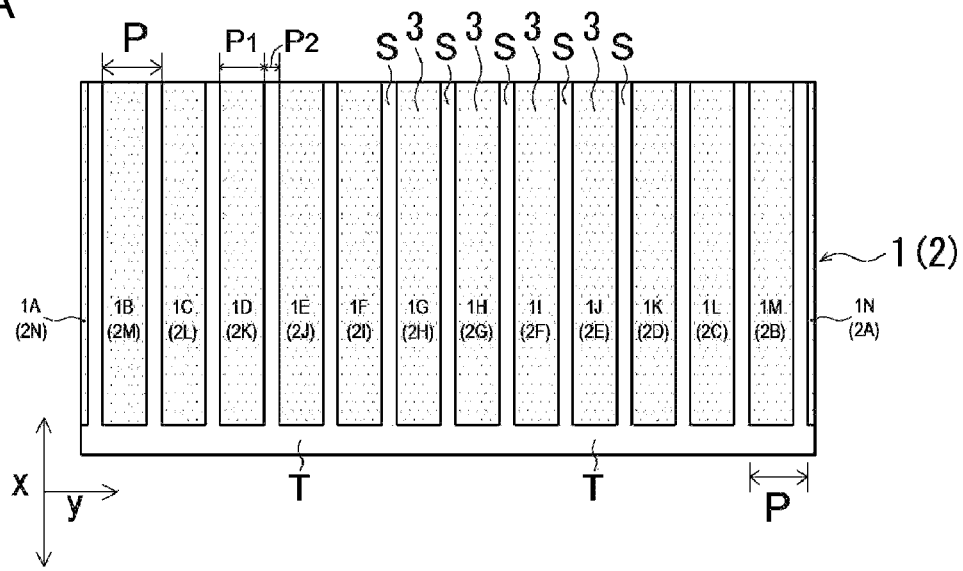
FIG. 1A is a plan view of a film capacitor device according to a first embodiment, showing metalized dielectric films.

As shown in FIG. 1A, a film capacitor device 10 according to a first embodiment includes multiple dielectric films 1 and dielectric films 2 that are stacked alternately. Each of the dielectric films 1 and 2 includes, on its surface, multiple metal strips (films) 3 that continuously extend in a first direction (x-direction in the figure).

Figure 1B:
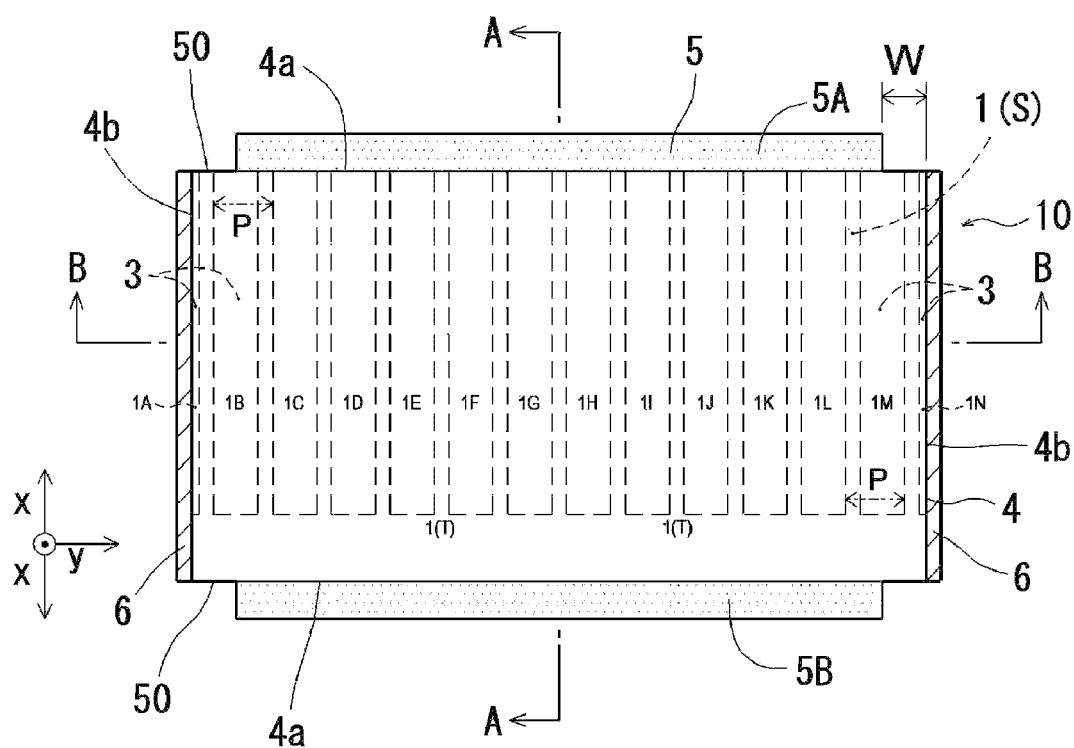
FIG. 1B is a plan view of the film capacitor device viewed from above.

After being stacked, the metal strips 3 serve as internal electrodes of the capacitor. The dielectric films 1 and 2 have the same structure as the structures shown in FIG. 1B and subsequent figures with the difference being their stacking orientations. To indicate the orientations in the stacked structure, the metal strips 3 are denoted with numerals 1A to 1N or numerals 2A to 2N in this order from an end of the dielectric film as shown in FIGS. 1A and 1D.

In the figures, the direction in which the metal strips 3 continuously extend parallel to one another is referred to as a first direction (x-direction), and the direction in which the metal strips 3 align parallel to one another (y-direction perpendicular to x-direction) is referred to as a second direction. The films are stacked on one another in a third direction (z-direction in the figures) perpendicular to the first and second directions.

The metal strips 3 on the surface of each of the dielectric films 1 and 2 are formed by depositing metal on a base film (substrate) by vapor deposition. Each of the dielectric films 1 and 2 has surface portions as grooves each exposed between the metal strips 3 adjacent to each other in y-direction (hereafter, insulation margins S), which are also referred to as small margins. The metal strips 3 are thus separate and are electrically insulated from one another.

Each of the insulation margins S (small margins) is continuous with an edge insulation area T at an end of the dielectric film in the first direction (x-direction). The edge insulation area T, which is also referred to as a large margin, continuously extends in the second direction (y-direction). The interval (pitch P) between the insulation margins S is equal to the sum of a width P1 of one metal strip 3 in y-direction and a width P2 of one insulation margin S in y-direction (P=P1+P2).

The dielectric films 1 and 2 included in the film capacitor device may be formed from an organic resin material such as polypropylene, polyethylene terephthalate, polyarylate, or cyclic olefin polymer.

Figure 1C:
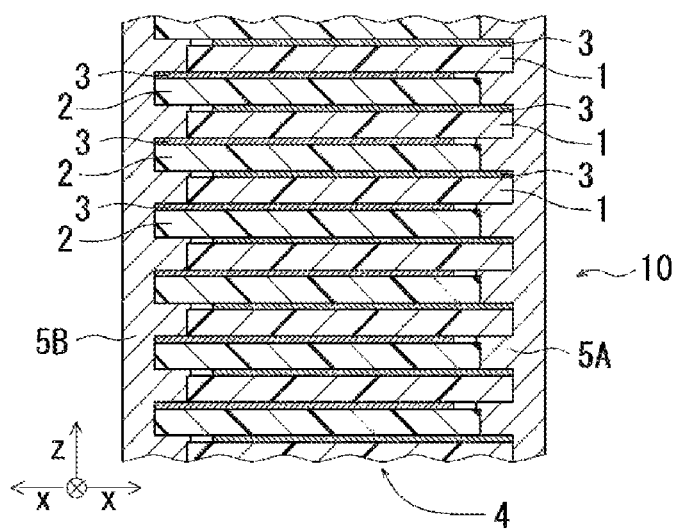
FIG. 1C is a cross-sectional view of the film capacitor device taken along line A-A in FIG. 1B.
Figure 1D:
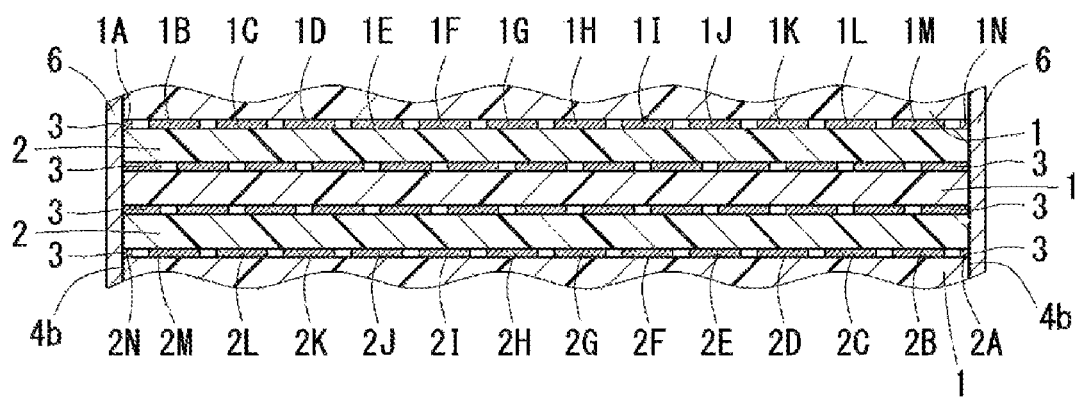
FIG. 1D is a cross-sectional view of the film capacitor device taken along line B-B in FIG. 1B.

As shown in FIG. 1C, a film stack 4 includes the dielectric films 1 and 2 that are adjacent to each other in the vertical direction (z-direction) in the figure and are stacked alternately in 180° opposite orientations in x-direction. More specifically, the dielectric films 1 and 2 are stacked on one another to have their edge insulation areas T each located at an end (edge) of the corresponding dielectric film 1 or 2 to be alternately opposite to each other in x-direction.

The film stack 4 includes, on its two end faces 4a in x-direction, metal electrodes that are formed by metal thermal spraying (hereafter, metal-sprayed electrodes). In the figure, 5A indicates the metal-sprayed electrode at one end face 4a in x-direction, and 5B indicates the metal-sprayed electrode at the other end face 4a in x-direction. These electrodes are simply at different positions and have the same structure. The metal-sprayed electrodes 5A and 5B may be simply referred to as the metal-sprayed electrodes 5 without being distinguished from each other.

The film capacitor device 10 according to the embodiment includes the metal-sprayed electrodes 5A and 5B on the two end faces 4a in x-direction. The metal-sprayed electrodes 5A and 5B are not arranged on the entire end faces 4a. The film capacitor device 10 includes electrode-free areas 50 including no metal-sprayed electrodes 5 on the two ends of each end face 4a in y-direction. Each electrode-free area 50 has a predetermined width W and continuously extends in the stacking direction. The electrode-free areas 50 are insulation areas that electrically insulate the metal strips 3 located at the two ends of the film capacitor device in y-direction among the multiple metal strips 3 from the metal-sprayed electrodes 5.

The width W of each electrode-free area 50 may be any dimension that can insulate one metal strip 3 located at each of the two ends in y-direction from the corresponding metal-sprayed electrode 5. The width W may thus be at least one time the pitch P between the insulation margins S. This allows the metal strip 3 at each of the two ends in y-direction to be insulated from the corresponding metal-sprayed electrode 5. The width W may be three times the pitch P or less. This structure reduces a decrease in capacitance resulting from insulation.

The insulation areas cause the metal strips 3 at the two ends in y-direction to be floating electrodes, reliably achieving insulation on the two end faces 4b in y-direction. The two end faces 4b in y-direction are cut surfaces. Some floating electrodes may overlap the metal strips 3 connected to the metal-sprayed electrodes 5 in a plan view in the stacking direction due to misalignment in stacking. This may cause a voltage to be applied to the floating metal strips 3 through capacitive coupling. When multiple floating metal strips 3 aligned in the stacking direction are exposed at the end faces, the differences in potential between the metal strips 3 may cause electric discharge.

The film capacitor device 10 according to one or more embodiments of the present disclosure includes a conductor 6 that continuously extends in the stacking direction on at least one of the two end faces 4b, which are the cut surfaces in y-direction. The conductor 6 serves as an equipotential area that electrically connects the floating metal strips 3 exposed at the cut surface to cause the exposed metal strips 3 to have the same potential. This reduces electric discharge at the cut surface.

The conductor 6 may continuously extend in the stacking direction to electrically connect the exposed metal strips 3 aligned in the stacking direction at the end face 4b in y-direction as described above. In other words, the conductor 6 may extend to cover at least a part of the end face 4b, instead of covering the entire end face 4b. In the present embodiment, the conductor 6 is located over the entire end face 4b. Any metal strips 3 exposed at the end face 4b may thus be reliably connected and have the same potential. The conductors 6 may not be located on each of the two end faces 4b in y-direction, and may be on either of the two end faces 4b. In the present embodiment, the conductors 6 are on both the two end faces 4b in y-direction.

The conductors 6 may be formed from any material using any method that allows electrical connection between the metal strips 3. Examples of the material for the conductors 6 include metal materials such as aluminum (Al), zinc (Zn), tin (Sn), silver (Ag), platinum (Pt), copper (Cu), nickel (Ni), iron (Fe), cobalt (Co), titanium (Ti), chromium (Cr), and lead (Pb). Metal powders including, for example, Cu, Ni, or Ag, or conductive adhesives containing carbon-based materials such as graphite may also be used. The conductors 6 may be formed from Al, Zn, or Sn by metal thermal spraying or sputtering.

Figure 2:
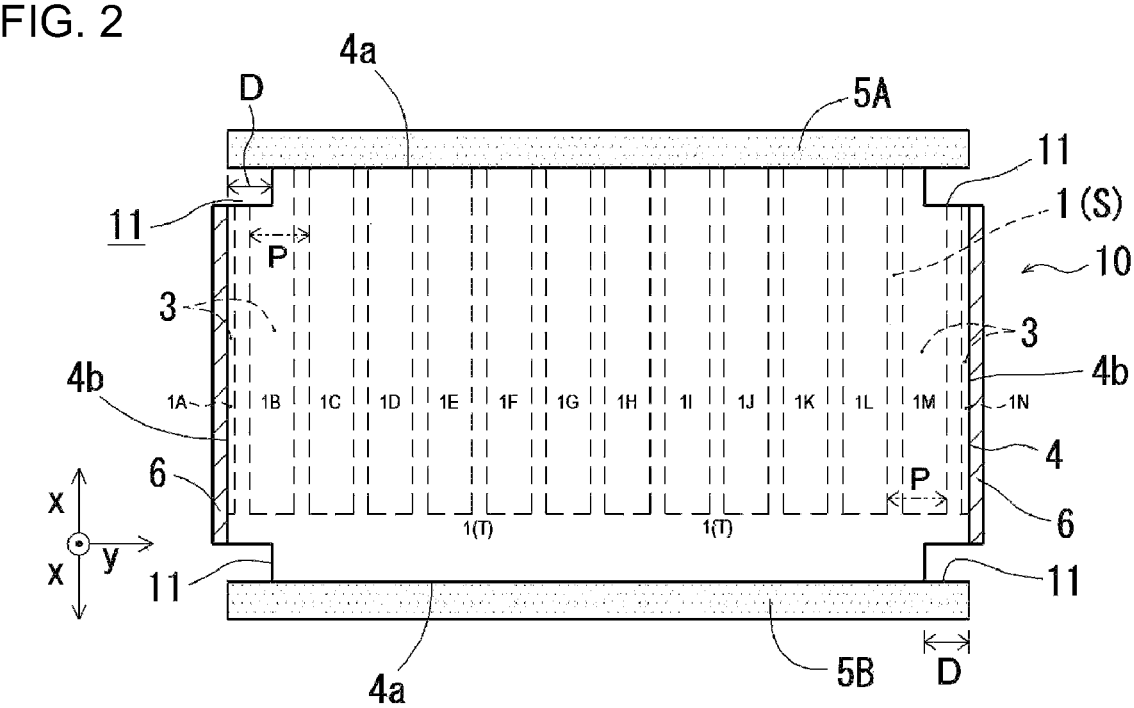
FIG. 2 is a plan view of a film capacitor device according to a second embodiment.

A film capacitor device 10 according to a second embodiment will now be described. FIG. 2 is a plan view of a film capacitor device corresponding to FIG. 1B. The insulation areas electrically insulating the metal strips 3 at the two ends in y-direction from the metal-sprayed electrodes 5 in the second embodiment differ from the insulation areas in the first embodiment. The insulation areas in the present embodiment include recesses 11 between the metal-sprayed electrodes 5 and the film stack 4.

The recesses 11 at the two ends of the film capacitor device 10 in y-direction separate the metal strips 3 from the metal-sprayed electrodes 5A and 5B. In the present embodiment, the film capacitor device 10 has four recesses 11 in total, which are two recesses 11 at one end of the film stack 4 in x-direction and two recesses 11 at the other end.

Each recess 11 continuously extends in the stacking direction of the film (z-direction) between the metal-sprayed electrode 5A or 5B and the film stack 4 or in an area including the interface (boundary) between the metal-sprayed electrode 5A or 5B and the film stack 4. The recess 11 is open to an end face 4b of the film stack 4 in y-direction and has a depth D (y-direction) that is the same as the width W of each electrode-free area in the first embodiment. The recess 11 can insulate the metal strip 3 at one of the two ends in y-direction from the corresponding metal-sprayed electrode 5.

In the second embodiment as well, when multiple floating metal strips 3 aligned in the stacking direction are exposed at the two end faces 4b in y-direction, the differences in potential between the metal strips 3 may cause electric discharge as in the first embodiment. The film capacitor device 10 according to the second embodiment also includes conductors 6 that continuously extend in the stacking direction on each of the two end faces 4b, which are the cut surfaces in y-direction. The conductors 6 can reduce electric discharge.

Figure 3:
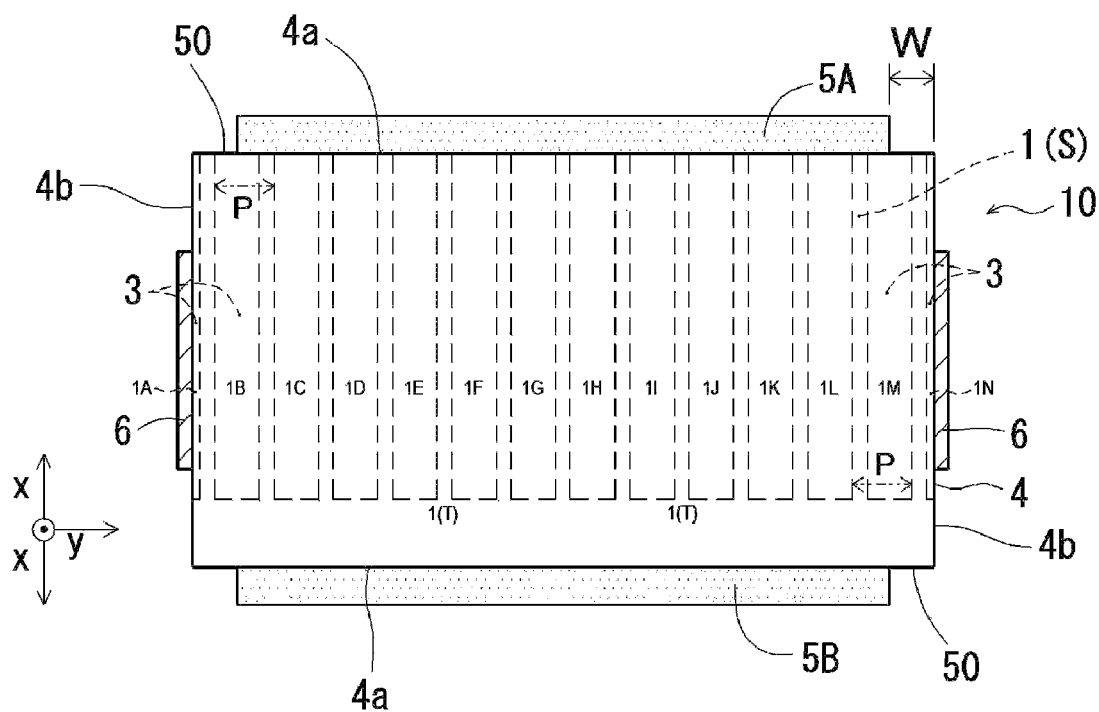
FIG. 3 is a plan view of a film capacitor device according to a third embodiment.

A film capacitor device 10 according to a third embodiment will now be described. FIG. 3 is a plan view of a film capacitor device corresponding to FIG. 1B. The conductors 6 on the two end faces 4b in y-direction in the third embodiment differ from the conductors 6 in the first embodiment. The conductors 6 in the present embodiment extend linearly in the stacking direction in a middle portion in x-direction, instead of being arranged on the entire end faces 4b. In other words, each end face 4b includes areas without any conductors 6 at its two ends in x-direction.

For example, electrode-free areas including no metal-sprayed electrodes 5 on the two end faces 4a in x-direction with a relatively small width W may cause a conductor 6 on the entire end face 4b to be closer to metal-sprayed electrodes 5 at the corners of the film stack 4. This may possibly cause a short circuit. To electrically connect multiple metal strips 3 exposed at the end face to one another, the conductor 6 may simply extend in the middle portion in x-direction on the end face 4b in y-direction in the present embodiment. In the film capacitor device 10 according to the third embodiment as well, the conductor 6 can reduce electric discharge.

Figure 4:
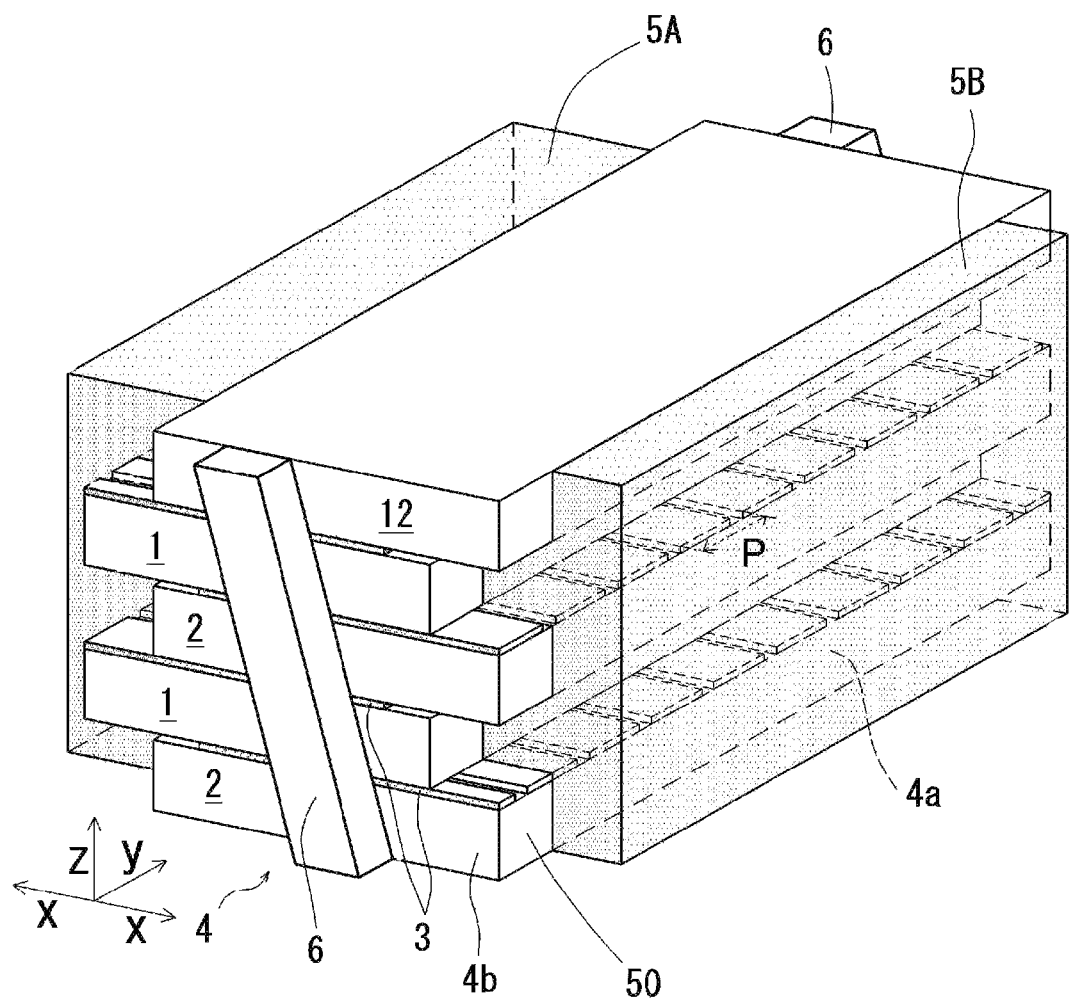
FIG. 4 is a perspective view of a film capacitor device according to a fourth embodiment.

A film capacitor device 10 according to a fourth embodiment will now be described. FIG. 4 is a perspective view of a film capacitor device. The conductors 6 on the end faces 4b in y-direction in the fourth embodiment differ from the conductors 6 in the third embodiment. The conductors 6 in the present embodiment extend obliquely in a middle portion in x-direction in the stacking direction.

In the present embodiment as well, the conductors 6 extend in the middle portion in x-direction to reduce a short circuit between the conductors 6 and the metal-sprayed electrodes 5 as in the third embodiment. The metal strips 3 are exposed in a nonuniform manner on the end faces 4b in y-direction, which are the cut surfaces. The conductors 6 extending obliquely in the stacking direction can be more easily connected to the metal strips 3 than the conductors 6 extending linearly. In the film capacitor device 10 according to the fourth embodiment as well, the conductors 6 can reduce electric discharge.

The film stack 4 in the fourth embodiment includes an insulating layer 12 on its upper surface. The insulating layer 12 is, for example, a dielectric film with no metal strips 3 and serves as a protective layer (film) for the stack. The insulating layer 12 may be eliminated. In the first to third embodiments described above, the insulating layer 12 may be stacked on the upper surface of the film stack 4 as in the fourth embodiment.

A method for manufacturing the stacked film capacitor device 10 will now be described. Multiple dielectric films 1 and 2 each including multiple metal strips 3 that continuously extend in x-direction are first stacked alternately in opposite orientations in x-direction. More specifically, the stacked dielectric films 1 and 2 include adjacent dielectric films in 180° opposite orientations in x-direction (first direction) and alternate dielectric films having their edge insulation areas T overlapping in a plan view.

As described above, the dielectric films 1 and films 2 have the same structure but different orientations in x-direction. The elongated dielectric films 1 and 2 may be stacked with a known method, such as winding the films around a cylindrical core or a polygonal core.

The stack is then cut into a predetermined length to obtain the film stack 4. In a perspective view of FIG. 4, the vertically adjacent dielectric films 1 and 2 are offset from each other in the direction in which the metal strips 3 continuously extend (x-direction) in the stacked structure. Each metal strip 3 thus has an end exposed at either of the two end faces 4a of the film stack 4 in x-direction.

The metal-sprayed electrodes 5A and 5B are then formed by metal thermal spraying onto the two end faces 4a of the film stack 4 in x-direction. The metal strips 3 have their ends exposed at the corresponding end faces 4a. The metal strips 3 on the dielectric films 1 and 2 are thus electrically connected to the corresponding metal-sprayed electrodes 5A or 5B to function as internal electrodes of the film capacitor device. The two end faces 4a of the film stack 4 in x-direction may be masked before metal thermal spraying to form the electrode-free areas 50.

The conductors 6 are then formed on the two end faces 4b of the film stack 4, which are the cut surfaces in y-direction. The conductors 6 may be formed by, for example, applying a conductive adhesive as described above. The metal-sprayed electrodes 5 and the conductors 6 may be formed in any order, and either may be formed first.

The film capacitor device 10 can be manufactured with the method described above. The film capacitor device 10 having the recesses 11 in the second embodiment will now be described.

The recesses 11 are open to the two end faces 4b in y-direction and separate the metal strips 3 from the metal-sprayed electrodes 5A and 5B. The recesses 11 may be formed to continuously extend in the stacking direction by, for example, machining or cutting. The recesses 11 may be, for example, cutouts, slits, or notches.

The recesses 11 may have the depth D in y-direction at least one time the pitch P, which is the sum of the width of one metal strip 3 and the width of one insulation margin S. Each recess 11 may be formed between the metal-sprayed electrode 5 and the film stack 4. The film stack 4 may be cut alone, or both the metal-sprayed electrode 5 and the film stack 4 including the interface (boundary) between them may be cut together.

The film capacitor device with the above structure includes the conductors 6 on the end faces 4b, which are the cut surfaces in y-direction (second direction). The conductors 6 electrically connect the floating metal strips 3 exposed at the cut surfaces to one another to cause these metal strips 3 to have the same potential. The film capacitor device with the conductors 6 can reduce electric discharge resulting from the metal strips 3 exposed at the cut surfaces.

The present disclosure may be implemented in the following forms.

A film capacitor device according to one or more embodiments of the present disclosure includes a film stack being rectangular, external electrodes, insulation areas, and a conductor. The film stack includes a plurality of dielectric films being stacked. Each of the plurality of dielectric films includes a plurality of metal strips extending in a first direction on a surface of the dielectric film. Each of the plurality of dielectric films includes an insulation margin extending in the first direction as a groove between adjacent metal strips of the plurality of metal strips. Each of the plurality of dielectric films includes, at an edge of the surface of the dielectric film in the first direction, an edge insulation area continuously extending in a second direction perpendicular to the first direction. The plurality of dielectric films include adjacent dielectric films in 180° opposite orientations in the first direction on the surface and alternate dielectric films having the edge insulation areas overlapping in a plan view. The external electrodes are on a pair of end faces of the film stack in the first direction. The insulation areas electrically insulate metal strips of the plurality of metal strips at two ends of the film stack in the second direction from the external electrodes. The conductor continuously extends in a stacking direction on at least one of a pair of end faces of the film stack in the second direction.

The film capacitor device according to one or more embodiments of the present disclosure can reduce electric discharge on the end faces.

The present disclosure may be embodied in various forms without departing from the spirit or the main features of the present disclosure. The embodiments described above are thus merely illustrative in all respects. The scope of the present disclosure is defined not by the description given above but by the claims. Any modifications and alterations contained in the claims fall within the scope of the present disclosure.

REFERENCE SIGNS LIST 1, 2 dielectric film
3 metal strip
4 film stack
4a end face in x-direction
4b end face in y-direction
5A, 5B metal-sprayed electrode (metal electrode)
6 conductor
10 film capacitor device
11 recess
50 electrode-free area
S insulation margin
T edge insulation area

The invention claimed is:

1. A film capacitor device, comprising:
a film stack being rectangular and including a plurality of dielectric films being stacked, each of the plurality of dielectric films including a plurality of metal strips extending in a first direction on a surface of the dielectric film, each of the plurality of dielectric films including an insulation margin extending in the first direction as a groove between adjacent metal strips of the plurality of metal strips, each of the plurality of dielectric films including, at an edge of the surface of the dielectric film in the first direction, an edge insulation area continuously extending in a second direction perpendicular to the first direction, the plurality of dielectric films including adjacent dielectric films in 180° opposite orientations in the first direction on the surface and alternate dielectric films having the edge insulation areas overlapping in a plan view;
external electrodes on a pair of end faces of the film stack in the first direction;
insulation areas electrically insulating metal strips of the plurality of metal strips at two ends of the film stack in the second direction from the external electrodes; and
a conductor continuously extending in a stacking direction on at least one of a pair of end faces of the film stack in the second direction.

2. The film capacitor device according to claim 1, wherein the conductor extends entirely over each of the pair of end faces of the film stack in the second direction.

3. The film capacitor device according to claim 1, wherein the insulation areas include electrode-free areas with no external electrode, and the electrode-free areas are on the pair of end faces of the film stack in the first direction.

4. The film capacitor device according to claim 1, wherein the insulation areas include recesses continuously extending in the stacking direction of the dielectric films on the pair of end faces of the film stack in the second direction, and the recesses separate the film stack from the external electrodes.

5. A film capacitor device, comprising:
a film stack being rectangular and including a plurality of dielectric films being stacked, each of the plurality of dielectric films including a plurality of metal strips extending in a first direction on a surface of the dielectric film, each of the plurality of dielectric films including an insulation margin extending in the first direction as a groove between adjacent metal strips of the plurality of metal strips, each of the plurality of dielectric films including, at an edge of the surface of the dielectric film in the first direction, an edge insulation area continuously extending in a second direction perpendicular to the first direction, the plurality of dielectric films including adjacent dielectric films in 180° opposite orientations in the first direction on the surface and alternate dielectric films having the edge insulation areas overlapping in a plan view;
external electrodes on a pair of end faces of the film stack in the first direction;
insulation areas electrically insulating metal strips of the plurality of metal strips at two ends of the film stack in the second direction from the external electrodes; and
an equipotential area electrically connecting metal strips exposed, among the metal strips at the two ends of the film stack in the second direction, at the pair of end faces of the film stack in the second direction to one another on the pair of end faces to cause the metal strips exposed at one end face of the pair of end faces to have the same potential.

* * * * *